3,288,755
PROCESS FOR THE MANUFACTURE OF
COPOLYETHERESTERS
Wolfgang Griehl and Hans Lückert, Chur, Graubunden, Switzerland, assignors to Inventa A.G. für Forschung und Patentverwertung, Zurich, Switzerland
No Drawing. Filed Feb. 19, 1964, Ser. No. 346,026
5 Claims. (Cl. 260—47)

The invention relates to the manufacture of copolyetheresters and, more particularly, to an improvement in such manufacture. It is a continuation-in-part of our copending application Serial Number 44,563, filed July 22, 1960 and now abandoned, which, in turn, is a continuation-in-part of our application Serial Number 853,673, filed November 18, 1959, now Patent Number 3,056,761, issued October 2, 1962.

The patent named above describes the production of copolyetheresters from terephthalic acid, β-oxyethoxy vanillic acid and ethylene glycol, which, as compared to pure polyesters of terephthalic acid and ethylene glycol, displays considerable advantages, e.g., increased water acceptability and considerably improved dyeability.

For the preparation of the copolyetherester, the bis-β-oxyethyl terephthalate and β-oxyethyl vanillic acid-β-oxyethylester are heated in suitable proportions under condensation conditions and in the presence of a catalyst which promotes ester interchange. The β-oxyethoxy vanillic acid-β-oxyethyl ester or, respectively, the free β-oxyethoxy vanillic acid or a functional derivative of that acid, e.g., the methyl ester, must first be prepared in purest form, for instance by reaction of the alkali salts of vanillic acid or its esters with ethylene chlorohydrin or with ethylene oxide.

Unexpectedly it now has been found that the copolyetheresters disclosed in our Patent 3,056,761 can be produced in a much more simple manner. This is accomplished by using as starting products, with respect to the derivatives of the monocarboxylic acids having a phenolic hydroxyl group in para position relative to the carboxyl group, not the preformed glycol ethers of these acids or their esters, but the acids having free phenolic hydroxyl groups or their esters, respectively, themselves. The latter are produced much more easily and also much less expensively, and their refining is readily carried out. The etherification of the phenolic hydroxyl group with glycol or with glycolesters then takes place, under suitable process conditions, in part during the formation of the monomeric and oligomeric pre-products, but in part only during the actual polycondensation. Thereby, this method facilitates formation and interlinkage of the short and especially the long molecules of the copolyetherester not only by means of esterification and ester interchange, but also by means of etherification.

The production of the copolyetheresters in actual practice depends on whether the alkylesters of the aromatic oxycarboxylic acids and of the terephthalic acid are employed as starting materials or whether the free acids are used at the start which then are esterified directly with glycol or a glycol derivative. The method further depends upon whether the two components, oxycarboxylic acid and terephthalic acid, or their esters, are subjected to the ester interchange separately at first or immediately in common, prior to the common polycondensation.

Naturally as the one component the alkylester and as the other component the free acid can be used as starting material whereby, of course, separate preparation is required at the start, i.e., until the oligomeric condition has been attained.

The temperature, in general is held between 180 and 240° C. for substantially 2 to 8 hours, depending on the starting products, to attain the oligomeric state. If desired, pressure may be applied. Afterwards, heating at 240° C. is continued for 1 to 2 hours, and the polycondensation is carried out as the next step for 3–8 hours at approximately 260–290° C. at a good vacuum. The ester interchange or esterification which is accompanied by the partial etherification, opportunely is effected in the presence of catalysts. A number of metals, such as alkali metals, alkaline earth metals, Al, Zn, Pb, Sn, Bi, Co, Ge, Ti, Zr, La, Cd, Mn, Sb, either in situ or in the form of their oxides, carbonates, salts of organic and inorganic acids, complexes, metalorganic compounds have proved effective in quantities of 0.003–3.0 percent by weight, calculated as metal per total reactants. When the free acids are used as the starting products, typical esterification catalysts, such as p-toluenesulfonic acid, can also be used. Finally substances especially favoring etherification can be employed as catalysts, such as phosphoric acids, alkylphosphates, phosphonic acids, and alkaline earth acetates. Depending upon the process, the partial etherification occurs at 50 to 80 percent during the formation of oligomers. The remainder of the ether linkages forms during the ensuing polycondensation. The latter is carried out as described in our cited patent, if desired after addition of special polycondensation catalysts.

As effective polycondensation catalysts, we wish to name the following metals and their compounds which are soluble in the reaction mixture; Sb, Fe, U, Pb, Sn, Co, Bi, Ge, Ti, Zr, Mn, Zn. Furthermore, the following coordination compounds can be successfully employed for the acceleration of the polycondensation:

$M[Al(OR)_4]$, $TiX_4$ and ether complexes of $TiX_4$, $Li[AlH_4]$, $M_2[Zr(OR)_6]$, $M[HZr(OR)_6]$, $Me[Zr(OR)_6]$, $Me[HZr(OR)_6]_2$, $M_3[Al(OR)_6]$, $Me_3[Al(OR)_6]_2$, $M[HTi(OR)_6]$, $Me[Ti(OR_6]$, $Me[HTi(OR)_6]_2$, $Ti[(OR)_4]$ or $PbR_4$, wherein M is an alkali metal, Me an alkaline earth metal, and R is an alkylene group having 1 to 6 carbon atoms. X=halogen.

For the limitation of the molecular weights, viscosity stabilizers can be added to the reaction mixture in the form of monofunctional compounds, such as long-chain carboxylic acid esters or acid anhydrides, e.g., toluylic acid anhydride. These compounds are added to the reaction mixture before or, preferably, during the polyesterification. Quantities of 0.15–1.05%, preferably 0.45–0.75% by weight based on the amount of esters used are sufficient to stabilize the reaction mixture of the desired viscosity.

As usable aromatic oxycarboxylic acids, the following are named by way of example, but not limitation: p-oxybenzoic acid, 4-oxy-3-methyl benzoic acid, 4-oxy-3-chlorobenzoic acid, vanillic acid.

The proportions of oxymonocarboxylic acid and its esters, respectively, to terephthalic acid or its esters may vary within wide limits. In our Patent 3,056,761, 10 to 89 percent of the terephthalic acid compound had been named, calculated on the total reactants, and like amounts are instantly applicable.

It is evident that the process of polyetherester formation according to the invention offers considerable advantages over processes hitherto known, such as the ones disclosed in U.S. Patent 2,799,665, wherein the aromatic oxycarboxylic acids are reacted with alkylene carbonates.

The polyester resins according to the invention, made of p-oxybenzoic acid or of substituted p-oxybenzoic acids whose aromatic rings can carry substitutents in o- or m-position to the carboxyl group, which are unable to react during polycondensation, plus terephthalic acid and ethylene glycol, can be fabricated into fibers, films, bristles and foils, of excellent properties, e.g., superior tensile strength, and good dyeability.

The invention now will be further illustrated by the following examples. However, it should be understood that these are given merely by way of explanation, not

Example 1

304 g. p-oxybenzoic acid methyl ester, 33 g. dimethyl terephthalate and 170 ml. ethylene glycol are subjected to an ester interchange in the presence of 0.225 g. Mg-Ti-butylate in a round bottom flask provided with a short column. After the theoretical quantity methanol has distilled, the temperature of the reaction mixture is increased to 230–250° C., while a weak stream of oxygen-free nitrogen is conducted therethrough. The etherification of the p-oxybenzoic acid is terminated after 2–3 hours, and the so-called precondensate obtained, containing approximately 25 percent unetherified p-oxybenzoic acid, is entered into a suitable condensation vessel equipped with agitator, gas inlet and vacuum connection and is polycondensed. While conducting a stream of pure nitrogen through the reaction mixture, the temperature is raised to 280° C. and the vacuum applied is lowered to 0.3 to 1 mm. Hg. Good agitation is to be applied to the viscous melt, especially toward the end of the polyesterification, in order to facilitate the evaporation of the glycol which has split off. Thus, a faintly yellow resin is obtained which can be fabricated in the usual manner into tubes, fibers, foils, bristles, etc. However, the resin is particularly suited for the production of clear and transparent films of excellent electrical properties. The softening point of the copolyetherester is 184–192° C. A ½ percent solution of the copolyester in phenol and acetylene tetrachloride (50:50) has a relative viscosity of 1.320.

Example 2

63 g. vanillic acid glycol ester, 30 ml. ethylene glycol and 0.06 g. lead acetate are heated in a vessel equipped with an agitator and a short column for 3 hours at 240–250° C. at a pressure of 3 to 4 atmospheres. The reaction product obtained still contains approximately 70 percent unetherified p-oxybenzoic acid. It is heated, together with 254 g. bis-β-oxyethyleneterephthalate and 0.15 g. antimony acetate, in a condensation vessel equipped with agitator, gas inlet and vacuum line. The temperature is held at 260–280° C. and the vacuum applied gradually is lowered to 0.3 to 1 mm. Hg. After a condensation time of 1.5–2 hours, 2.5 g. p-toluylic acid anhydride are added to the already viscous melt, to serve as a molecular weight stabilizer. Thereafter, heating is continued for 2–3 hours under condensation conditions.

An entirely colorless and porcelain-like copolyetherester thus is obtained having a softening point of 218–225° C. Its 0.5 percent solution is phenol and acetylene tetrachloride (50:50) has a relative viscosity of 1.38.

Example 3

90 g. p-oxybenzoic acid methyl ester and 50 ml. ethylene glycol are heated at 180–235° C. in a round bottom flask provided with a fractionating column in the presence of 0.074 cobalt acetate. After completion of the ester interchange the reaction mixture is held for 2 hours at a temperature of 240° C. The product thus obtained then is polycondensed in mixture with precondensate of 783 g. dimethyl terephthalate, 405 ml. glycol and 0.405 cobalt acetate, obtained in a like manner. Polycondensation is carried out as described in Examples 1 and 2.

After a condensation time of 3–5 hours, the melt has attained the viscosity required for further fabrication. The copolyetherester has a softening point of 242–249° C. and can be fabricated very well into fibers, foils and other structures. A 0.5 percent solution in phenol and acetylene tetrachloride (50:50) has a relative viscosity of 1.580.

Example 4

68.5 g. 4-hydroxy-3-methylbenzoic acid and 42 g. ethylene glycol are heated at 170–220° C. in a round bottom flask equipped with a fractionating column. After approximately 3 to 4 hours, the reaction temperature is raised to 235–240° C. and heating continued for another 2 hours.

The resinous product thus obtained contains approximately 30 percent unetherified 4-hydroxy-3-methylbenzoic acid ester and is heated with 186 g. ethylene glycol to 230–240° C. in a pressure vessel equipped with a fractionating column and agitator. After this temperature has been attained, 423 g. purest terephthalic acid continuously are entered therein within 2 hours in quantities measured so that always a reactive mixture is present. During this time, water continuously distills which is collected by way of a condenser in a collection vessel. As soon as all of the terephthalic has reacted, the pressure is released, and the oligomer mixture thus obtained is polycondensed under addition of 0.500 g. manganese acetate.

We claim as our invention:

1. A process for the production of copolyetheresters of high tensile strength, elasticity and dyeability, suitable for fabrication into fibers, which comprises subjecting to an ester interchange and simultaneous esterification and copolymerization a substance selected from the group consisting of p-oxybenzoic and vanillic acids, oxyalkyl carboxylic acid esters of said acids and mixtures thereof, in mixture with ethylene glycol, with compounds selected from the group consisting of terephthalic acid and its dimethyl ester; together with a catalyst promoting ester interchange selected from the group consisting of Al, Zn, Pb, Sn, Bi, Co, Ge, Ti, Zr, Cd, Mn, and Sb in the form of metals, oxides and carbonates; while simultaneously forming the glycol ether of said acids; condensing the reaction mixture thus obtained in a single stage reaction and thereby simultaneously producing the copolyetherester.

2. The process as defined in claim 1, wherein said catalyst is present in quantities ranging from 0.0003 to 3 weight percent, calculated as metal on the total reactants.

3. The process as defined in claim 1, wherein condensation of said reaction mixture is carried out at 180–280° C. and at 0.3 to 1 mm. Hg. within ½ to 6 hours while conducting an inert gas therethrough; and evaporating the glycol which had split off during polycondensation.

4. The process as defined in claim 1, wherein said compound selected from the group consisting of terephthalic acid and its dimethyl ester is employed in an amount of substantially 10 to 89 weight percent, calculated on the total reactants.

5. The process as defined in claim 1, wherein polycondensation is carried out to a relative viscosity of 1.35 to 1.45, measured as a 0.5 weight percent solution in equal weight parts phenol and tetrachloroethane.

References Cited by the Examiner

UNITED STATES PATENTS

| | | | |
|---|---|---|---|
| 2,250,326 | 6/1944 | Du Vall | 260—47 |
| 2,692,248 | 10/1954 | Lincoln | 260—75 |
| 2,692,249 | 10/1954 | Lincoln | 260—75 |
| 3,056,761 | 10/1962 | Griehl | 260—47 |

WILLIAM H. SHORT, *Primary Examiner.*

J. C. MARTIN, *Assistant Examiner.*